United States Patent
Pihur et al.

(10) Patent No.: US 12,462,013 B2
(45) Date of Patent: *Nov. 4, 2025

(54) SOCIAL ACCOUNT RECOVERY

(71) Applicant: Snap Inc., Santa Monica, CA (US)

(72) Inventors: Vasyl Pihur, Santa Monica, CA (US); Jianping He, Los Angeles, CA (US); Luke Ramsey, Marina del Rey, CA (US); Benedict Copping, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 332 days.

This patent is subject to a terminal disclaimer.

(21) Appl. No.: 18/109,668

(22) Filed: Feb. 14, 2023

(65) Prior Publication Data
US 2023/0195879 A1  Jun. 22, 2023

Related U.S. Application Data

(63) Continuation of application No. 16/721,368, filed on Dec. 19, 2019, now Pat. No. 11,609,982.

(51) Int. Cl.
*G06F 21/45* (2013.01)
*G06F 21/40* (2013.01)
(Continued)

(52) U.S. Cl.
CPC .............. *G06F 21/45* (2013.01); *G06F 21/40* (2013.01); *H04L 9/085* (2013.01);
(Continued)

(58) Field of Classification Search
CPC ...... G06F 21/45; G06F 21/40; G06F 21/6272; G06F 2221/2115; G06F 2221/2131; H04L 9/085

See application file for complete search history.

(56) References Cited

U.S. PATENT DOCUMENTS 8,453,222 B1 * 5/2013 Newstadt .............. H04L 63/083
  726/4
9,935,940 B1 * 4/2018 DeMoss ................ H04L 63/083
(Continued)

FOREIGN PATENT DOCUMENTS

| CN | 114830109 A | 7/2022 |
| WO | WO-2016077121 A1 | 5/2016 |
| WO | WO-2021126864 A1 | 6/2021 |

OTHER PUBLICATIONS

U.S. Appl. No. 16/721,368, filed Dec. 19, 2019, Social Account Recovery.
(Continued)

*Primary Examiner* — David J Pearson
(74) *Attorney, Agent, or Firm* — Schwegman Lundberg & Woessner, P.A.

(57) ABSTRACT

Systems and methods are provided for performing operations including: receiving, via a messaging application of a user device, a request to recover access to an account of a user of the messaging application; accessing a first object corresponding to a first key; receiving, from a first friend of the user on the messaging application, a second object corresponding to a first portion of a second key; receiving, from a second friend of the user on the messaging application, a third object corresponding to a second portion of the second key; deriving the second key based on the second and third objects; and recovering access to the account of the user based on the first key and the second key.

20 Claims, 10 Drawing Sheets

(51) Int. Cl.
*H04L 9/08* (2006.01)
*G06F 21/62* (2013.01)
(52) U.S. Cl.
CPC .. *G06F 21/6272* (2013.01); *G06F 2221/2115* (2013.01); *G06F 2221/2131* (2013.01)

(56) References Cited

U.S. PATENT DOCUMENTS

| | | | |
|---|---|---|---|
| 11,057,210 B1* | 7/2021 | Sierra | H04L 9/3226 |
| 11,609,982 B2* | 3/2023 | Pihur | G06F 21/45 |
| 2001/0055388 A1 | 12/2001 | Kaliski | |
| 2004/0078775 A1* | 4/2004 | Chow | G06F 21/31 |
| | | | 717/100 |
| 2010/0293600 A1* | 11/2010 | Schechter | H04L 63/083 |
| | | | 726/4 |
| 2012/0166553 A1* | 6/2012 | Rubinstein | H04L 63/083 |
| | | | 709/204 |
| 2015/0242616 A1* | 8/2015 | Oprea | G06F 21/34 |
| | | | 726/1 |
| 2016/0140335 A1 | 5/2016 | Proulx et al. | |
| 2019/0207756 A1* | 7/2019 | Vass | H04L 9/0863 |
| 2019/0251249 A1 | 8/2019 | Sprague et al. | |
| 2019/0332792 A1 | 10/2019 | Kunii et al. | |
| 2020/0242232 A1* | 7/2020 | Machani | H04L 63/0884 |
| 2021/0192039 A1 | 6/2021 | Pihur et al. | |

OTHER PUBLICATIONS

"U.S. Appl. No. 16/721,368, Non Final Office Action mailed Aug. 4, 2022", 8 pgs.

"U.S. Appl. No. 16/721,368, Notice of Allowance mailed Nov. 14, 2022", 7 pgs.

"U.S. Appl. No. 16/721,368, Response filed Nov. 1, 2022 to Non Final Office Action mailed Aug. 4, 2022", 9 pgs.

"International Application Serial No. PCT/US2020/065138, International Preliminary Report on Patentability mailed Jun. 30, 2022", 8 pgs.

"International Application Serial No. PCT/US2020/065138, International Search Report mailed Apr. 9, 2021", 5 pgs.

"International Application Serial No. PCT/US2020/065138, Written Opinion mailed Apr. 9, 2021", 6 pgs.

"European Application Serial No. 20842080.2, Response to Communication pursuant to Rules 161 and 162 filed Dec. 19, 2022", 23 pgs.

"Korean Application Serial No. 10-2022-7024776, Final Office Action mailed Jan. 21, 2025", w/English Translation, 7 pgs.

"Korean Application Serial No. 10-2022-7024776, Notice of Preliminary Rejection mailed May 28, 2024", W/English Translation, 16 pgs.

"Korean Application Serial No. 10-2022-7024776, Response Filed Apr. 21, 2025 to Final Office Action mailed Jan. 21, 2025", w/ English Claims, 18 pgs.

"Korean Application Serial No. 10-2022-7024776, Response filed Jul. 25, 2024 to Notice of Preliminary Rejection mailed May 28, 2024", w/ current English claims, 18 pgs.

"Shamir's Secret Sharing", Wikipedia, [Online]. Retrieved from the Internet: <URL: https://web.archive.org/web/20191218130457/https://en.wikipedia.org/wiki/Shamir's_secret_sharing>, (Archived on Dec. 18, 2019), 7 pgs.

\* cited by examiner

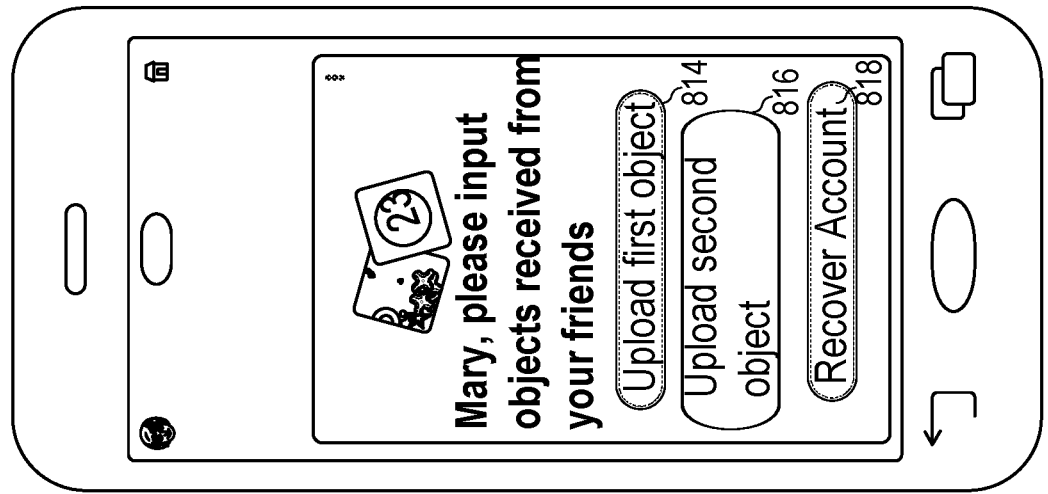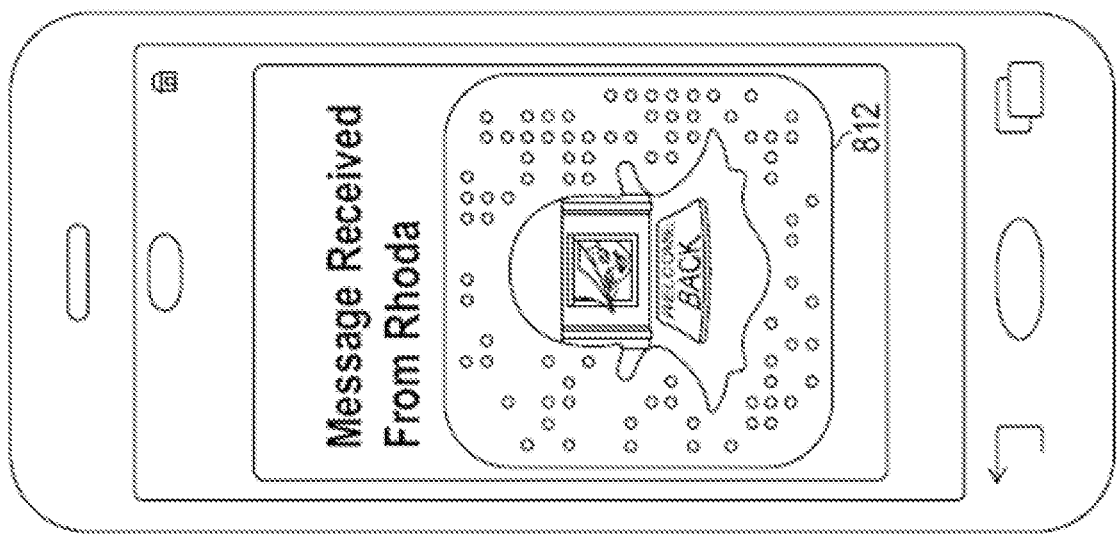
FIG. 8

SOCIAL ACCOUNT RECOVERY

CLAIM OF PRIORITY

This application is a continuation of U.S. patent application Ser. No. 16/721,368, filed on Dec. 19, 2019, which is incorporated herein by reference in its entirety.

TECHNICAL FIELD

The present disclosure relates generally to providing an account recovery system.

BACKGROUND

Modern day user devices provide users with access to their accounts using login credentials. The users input their username and password and can then access their accounts. Sometimes users forget their username and/or password and then need to confirm their identity somehow to reset their login credentials.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which:

FIGS. 6-8 are illustrative inputs and outputs of the account recovery system, according to example embodiments.

DETAILED DESCRIPTION

Figure 1:
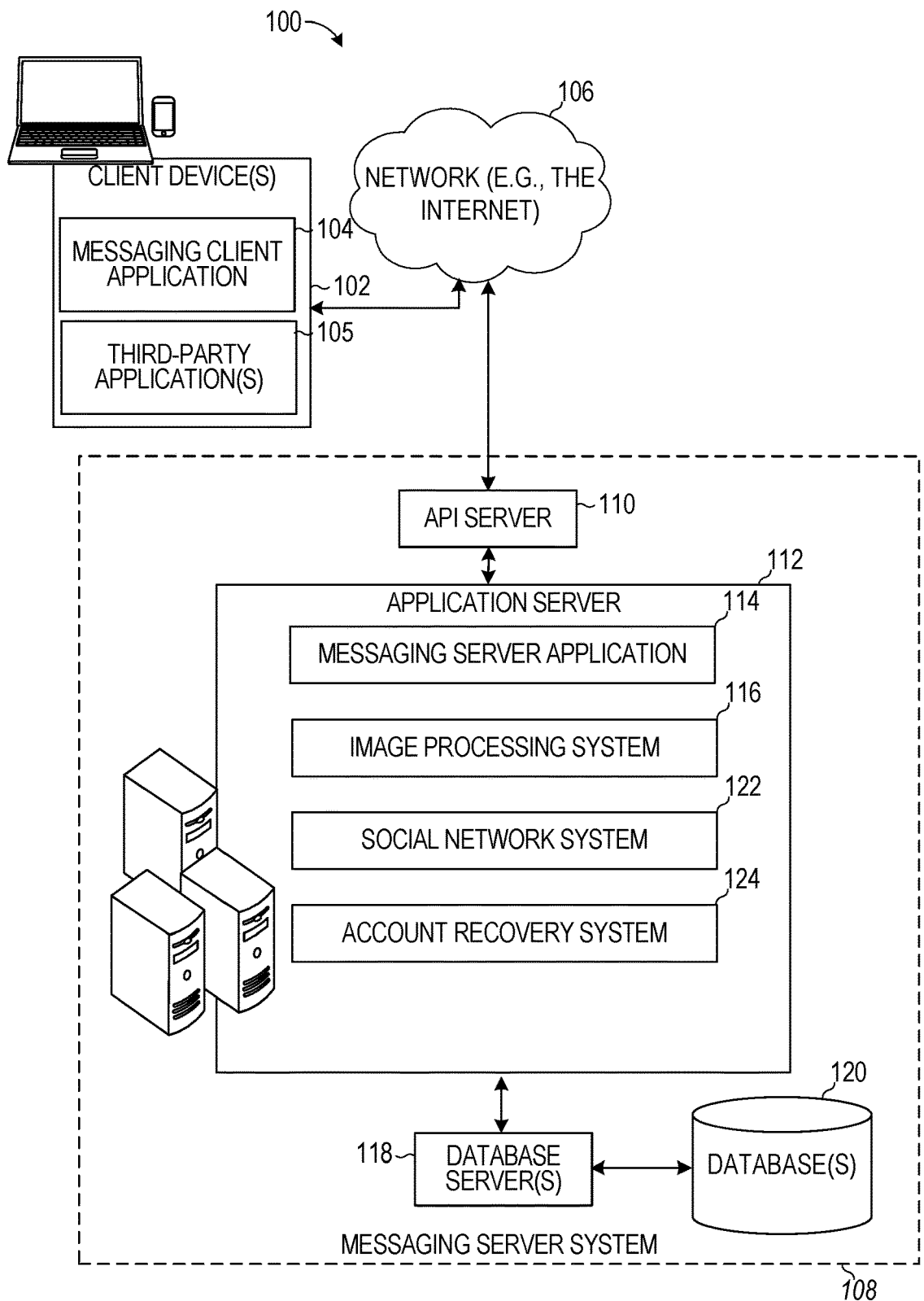
FIG. 1 is a block diagram showing an example messaging system for exchanging data (e.g., messages and associated content) over a network, according to example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments. It will be evident, however, to those skilled in the art, that embodiments may be practiced without these specific details. In general, well-known instruction instances, protocols, structures, and techniques are not necessarily shown in detail.

Typically, users log into their accounts by providing login credentials, such as a username and/or password. Sometimes users forget their credentials and then go through a password recovery process to reset their credentials. To reset the login credentials, typical systems email a link to a user that allows the user to reset their password after verifying their identity. For example, the user can answer one or more personal questions and then the system allows the user to reset their username and/or password. While such systems work well for recovering accounts, the account recovery process can take many steps and a great deal of time, which reduces the overall efficiency of the system. Also, some users forget the answers to the personal questions and get completely locked out of their accounts or have to go through an even more complex account recovery process. In addition, such systems are not provable secure as one cannot judge the difficulty of the questions a priori and how hard it will be to find hat information for a given user.

Certain social networks allow users to select several friends that can help a user recover access to their accounts. Any friend the user selects can be requested by the user to reset the user's account or provide the user's login credentials. Such social networking approaches work well to recover account access in case a user forgets their credentials, but can easily cause the user's account to become compromised. For example, any one of the selected friends can decide to independently access the user's account without permission from the user. Also, if a selected friend's account becomes compromised, then the user's account will also likely become compromised.

Other social networks leverage a user's friends to perform two-factor authentication and do not provide other mechanisms to recover access to a user account. Namely, other social networks determine that a user has successfully logged into the system (e.g., entered proper login credentials) but the login meets some criteria indicating suspicious activity. In such cases, the social networks communicate with the user's friends to verify the identity of the user by requesting that the friends input some code provided by the user but do not recover access to an account to which the user does not recall the login credentials.

The disclosed embodiments improve the efficiency of using the electronic device by providing a system that allows a user to recover access to their account with the help of two or more friends. The disclosed system employs a process by which the user's friends can help the user recover access to the user's account but information available to each individual friend cannot by itself enable access to the user's account. In this way, the user's friends can help the user recover access to the account without compromising security. Namely, security of the user's account is maintained and access to the user's account cannot be compromised by a single or by more than one friend.

Specifically, according to the disclosed embodiments, a messaging application implemented by one or more processors of a user device receives a request to recover access to an account of a user of the messaging application. In response, the messaging application accesses a first object corresponding to a first key and receives, from first and second friends of the user, second and third objects corresponding to respective portions of a second key. After deriving the second key based on the second and third objects, access to the account of the user is recovered based on the first key and the second key.

As an example, first and second secrets are generated for the user and can be used together to recover access to the user's account. The first secret can be locally maintained by the user on the user's device. The second secret may be a polynomial (e.g., a line) that can be generated when two points of the line are received. A server enables a first friend to obtain a first of the two points and a second friend to obtain a second of the two points. After the two friends provide the two points to the user, the user's device can recreate the second secret. Because the first or second friends only know one of the two points needed to generate the line to determine the second secret, neither of the friends alone can derive the second secret to attempt to access the user's account. Also, the first secret is not available to any of the user's friends, which further prevents unauthorized account recovery from being performed.

In this way, the disclosed embodiments improve the efficiency of using the electronic device by reducing the number of screens and interfaces a user has to navigate through to recover access to their account when the user forgets their login credentials. This is done by storing a first key on the user's account and communicating with two or more friends to recover a second key needed to recover access to the user's account. This reduces the device resources (e.g., processor cycles, memory, and power usage) needed to accomplish a task with the device.

FIG. 1 is a block diagram showing an example messaging system 100 for exchanging data (e.g., messages and associated content) over a network 106. The messaging system 100 includes multiple client devices 102, each of which hosts a number of applications, including a messaging client application 104 and a third-party application 105. Each messaging client application 104 is communicatively coupled to other instances of the messaging client application 104, the third-party application 105, and a messaging server system 108 via a network 106 (e.g., the Internet).

Accordingly, each messaging client application 104 and third-party application 105 is able to communicate and exchange data with another messaging client application 104 and third-party application(s) 105 and with the messaging server system 108 via the network 106. The data exchanged between messaging client applications 104, third-party applications 105, and between a messaging client application 104 and the messaging server system 108 includes functions (e.g., commands to invoke functions) and payload data (e.g., text, audio, video, or other multimedia data). Any disclosed communications between the messaging client application 104 and the third-party application(s) 105 can be transmitted directly from the messaging client application 104 to the third-party application(s) 105 and/or indirectly (e.g., via one or more servers) from the messaging client application 104 to the third-party application(s) 105.

The third-party application(s) 105 and the messaging client application 104 are applications that include a set of functions that allow the client device 102 to access an account recovery system 124. The third-party application 105 is an application that is separate and distinct from the messaging client application 104. The third-party application(s) 105 are downloaded and installed by the client device 102 separately from the messaging client application 104. In some implementations, the third-party application(s) 105 are downloaded and installed by the client device 102 before or after the messaging client application 104 is downloaded and installed. The third-party application 105 is an application that is provided by an entity or organization that is different from the entity or organization that provides the messaging client application 104. The third-party application 105 is an application that can be accessed by a client device 102 using separate login credentials than the messaging client application 104. Namely, the third-party application 105 can maintain a first user account and the messaging client application 104 can maintain a second user account. In an embodiment, the third-party application 105 can be accessed by the client device 102 to perform various activities and interactions, such as listening to music, watching videos, tracking exercises, viewing graphical elements (e.g., stickers), shopping for physical items or goods, communicating with other users, and so forth.

As an example, the third-party application 105 can be a social networking application, a dating application, a ride or car sharing application, a shopping application, a trading application, a gaming application, an imaging application, a music application, a video browsing application, an exercise tracking application, a health monitoring application, a second messaging application, or any other suitable application.

In some embodiments, the messaging client application 104 allows a user to recover access to the user's account in case the user forgets the login credentials. For example, the user can select a "forgot password" option to socially recover access to the user's account by communicating with two or more friends. In order to enable this functionality, the messaging client application 104 provides a user with a social account recovery setup option. In response to receiving a user selection of this social account recovery setup option, the messaging client application 104 generates two secrets that are needed to recover access to the user's account. A first of the secrets can be an integer value and maintained locally by the user. For example, the first secret may be encoded in a graphical element (e.g., a barcode or visual code) and the user can capture a screenshot of the graphical element. The graphical element can be decoded by the messaging client application 104 to recover the first secret. The first secret will be referred to as the secret P. The messaging client application 104 generates a hash of the secret P and a user identifier (user ID) of the user. This hash, referred to as HMAC(P, user ID), is stored on the server in association with the user account.

A second of the secrets can be generated by the messaging client application 104 as a k-degree polynomial. The second secret will be referred to as the secret Q. For purposes of illustration, this disclosure pertains to a 1-degree polynomial or a second secret that is a line, but any number of degrees can be applicable. As the number of degrees increases, the number of friends a user needs to contact and receive portions of the second secret also increases. For example, when the second secret is a 1-degree polynomial, or a line, any two points along the line can be used to recover the polynomial or the second secret. As such, one of the two points can be provided by a first friend and a second of the two points can be provided by a second friend. For a 2-degree polynomial, more than two points (e.g., 4 points) may be needed to recover the second secret or the polynomial, and thus more than two friends, such as 4 friends, may be needed to provide the points along the polynomial to enable the user device to recover the polynomial (e.g., the second secret). The messaging client application 104 generates a hash of the secret Q and a user identifier (user ID) of the user. This hash, referred to as HMAC(Q, user ID), is stored on the server in association with the user account.

The messaging client application 104 can upload and store on the server a hash of the first and second secrets and the user identifier (e.g., HMAC(P+Q, user ID)). In some cases, the messaging client application 104 sends P+Q and the user ID to the server and the server computes the hash function HMAC(P+Q, user ID) based on the first and second secrets and user identifier provided by the messaging client application 104. In this way, when the messaging client application 104 is in possession of the first and second secrets, during an account recovery procedure, the messaging client application 104 can hash the first and second secrets with a user identifier to recover the account. For example, the server can receive the value of HMAC(P+Q, user ID) and compare that with the previously stored hash for account recovery to authorize the user to change the password and/or username when a match exists. Namely, the messaging client application 104 provides the hashed value to a server, and if the hashed value matches a previously stored hashed value, the server authorizes the user to recover access to the account. For example, the server may allow the user to change the username and/or password of the account.

In some cases, the messaging client application 104 generates another secret (key) P' from the first secret P. The messaging client application 104 generates a hash of the secret P' and a user identifier (user ID) of the user. This hash, referred to as HMAC(P', user ID), is stored on the server in association with the user account. In some cases, in order to trigger the account recovery for the user, the messaging client application 104 uses the secret (key) P' from the first secret P together with the user identifier. Namely, the messaging client application 104 sends the hash of the secret P' with the user identifier to the server rather than the first secret P itself. If the server verifies that this received hash matches the previously stored hash of P', then the server initiates and enables the social account recovery procedure. This avoids prematurely revealing the first secret P in triggering the account recovery process.

As an example, after the user sets up the social account recovery process, the messaging client application 104 requests that the user provide the first secret. The user can provide the first secret by uploading or capturing an image of the graphical element that encodes the first secret P (e.g., the integer value). Next, the messaging client application 104 derives P' from P and computes a hash of the user identifier and P'. The messaging client application 104 communicates this hash to the server. The server verifies that this computed hash matches a previously stored hash that is associated with triggering social account recovery. In such cases, the server enables the social account recovery procedure on the account.

The user communicates, via the third-party application 105, with a first friend with which the user is bi-directionally connected to on the messaging client application 104. For example, the user calls the first friend via the third-party application 105 and requests that the first friend authorize the social account recovery for the user. Alternatively, the user sends a text or audio message to the first friend via the third-party application 105 and requests that the first friend authorize the social account recovery for the user. The first friend logs into their messaging client application 104 and identifies the user in a list of friends of the friend. The first friend selects a social account recovery option for the identified user and transmits a message to the server requesting that the server recover the user's account. In response, the server verifies that the social account recovery procedure has been enabled on the account (e.g., a previous communication has been received from the user that included a hash of the derived first secret P' and the user identifier). If the social account recovery procedure has been enabled, the server computes a value specific to the first friend based on the second secret (e.g., the second key). Namely, the server retrieves the second secret Q associated with the user's account and randomly selects a first point along the polynomial corresponding to the second secret Q. The selection may be deterministic for the first friend such that the first friend always receives the same point during account recovery for the particular user. The server sends the first point to the first friend by encoding the first point in a graphical element. The first friend then sends the graphical element that encodes the first point to the user via the third-party application 105.

The user also communicates, via the third-party application 105, with a second friend with which the user is bi-directionally connected on the messaging client application 104. For example, the user calls the second friend via the third-party application 105 and requests that the second friend authorize the social account recovery for the user. Alternatively, the user sends a text or audio message to the second friend via the third-party application 105 and requests that the second friend authorize the social account recovery for the user. The second friend logs into their messaging client application 104 and identifies the user in a list of friends of the friend. The second friend selects a social account recovery option for the identified user and transmits a message to the server requesting that the server recover the user's account. In response, the server verifies that the social account recovery procedure has been enabled on the account (e.g., a previous communication has been received from the user that included a hash of the derived first secret P' and the user identifier). If the social account recovery procedure has been enabled, the server computes a value specific to the second friend based on the second secret (e.g., the second key). Namely, the server retrieves the second secret Q associated with the user's account and randomly selects a second point along the polynomial corresponding to the second secret Q. The second point is different from the first point selected for the first friend. The selection may be deterministic for the second friend such that the second friend always receives the same point during account recovery for the particular user. The server sends the second point to the second friend by encoding the second point in a graphical element. The second friend then sends the graphical element that encodes the second point to the user via the third-party application 105.

The user, after receiving the graphical elements or objects from the first and second friends, inputs the graphical elements or objects received from the first and second friends into the messaging client application 104. For example, the user can upload the graphical elements or objects and/or may capture an image using a camera of the graphical elements or objects. The messaging client application 104 decodes the first and second points from the graphical elements or objects received from the first and second friends. The messaging client application 104 computes the polynomial based on the first and second points that correspond to the second secret. At this point, the messaging client application 104 is in possession of the first and second secrets and can combine the first and second secrets together with the user identifier to recover the user's account. Namely, the messaging client application 104 computes a hash of the first secret, second secret, and user identifier and sends this hash to the server. In response to determining that this hash matches a previously stored hash for recovering the user's account on the server, the server navigates the user to a screen that allows the user to login and/or change a username and/or password of the user's account.

In some embodiments, after recovering the user's account, the server may instruct the messaging client application 104 to generate a new set of first and second secrets. The messaging client application 104 may generate the new set of first and second secrets in the same way as before and may store the hash values associated with the new set of first and second secrets on the server. The server may replace the previously stored hash values with the new hash values that are computed.

In some embodiments, the previously stored hash values of the first and/or second secrets that are on the server may be used to perform two-factor authentication. For example, a user may successfully log into the messaging client application 104. The server may determine that the logging in activity satisfies a suspicious activity criterion that requires a second factor authentication. This criterion may be set by the user to always require a second factor authentication and/or may be set based on rules associated with unauthorized computers or IP addresses. In such cases, the server may request that the messaging client application 104 provide second factor authentication using the first and/or second secrets. To do so, the user can provide the first secret to the messaging client application 104 by capturing an image of the graphical element or object that encodes the first secret or uploading an image or graphical element and/or inputting the value of the first secret. In response, the messaging client application 104 computes a hash of the first secret decoded from the graphical element and an identifier of the user. The messaging client application 104 sends this hash to the server. In response to determining that this hash matches a previously stored hash on the server of the first secret and the user identifier, the server may determine that the second factor authentication has been satisfied. In some cases, rather than sending the hash for storage on the server, the messaging client application 104 sends the plain text P, Q, P+Q, and/or P' and the user identifier to the server and then the server then computes and stores the relevant hash function of the plain text information that the server receives (e.g., HMAC(P, user ID), HMAC(Q, user ID), HMAC(P+Q, user ID), and/or HMAC(P', user ID)) can be computed by the server based on plain text P, Q, P', and/or P+Q provided by the client device).

In some implementations, the user can communicate with two or more friends to obtain the graphical elements or objects associated with the second secrets. For example, the user can communicate, via the third-party application 105, with first and second friends with which the user is bi-directionally connected on the messaging client application 104. The first and second friends then each log into their messaging client application 104 and identify the user in a list of friends of the friends. The first and second friends select a two-factor authentication option for the identified user and transmit a message to the server requesting that the server provide the second secret portions. In response, the server verifies that two-factor authentication is enabled for the user and computes first and second values specific to the first and second friends based on the second secret (e.g., the second key). Namely, the server retrieves the second secret Q associated with the user's account and randomly selects first and second points along the polynomial corresponding to the second secret Q. The server sends the first and second points respectively to the first and second friends by encoding the points graphical elements or objects. The first and second friends then send the graphical elements that encode the first and second points to the user via the third-party application 105. The user can then provide the graphical elements that encode the first and second points to the messaging client application 104 to recover the second secret. The messaging client application 104 computes a hash of the second secret and an identifier of the user. The messaging client application 104 sends this hash to the server. In response to determining that this hash matches a previously stored hash on the server of the second secret and the user identifier, the server may determine that the second factor authentication has been satisfied.

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, graphical elements, geolocation information, media annotation and overlays, virtual objects, message content persistence conditions, social network information, and live event information, as examples. Data exchanges within the messaging system 100 are invoked and controlled through functions available via user interfaces (UIs) (e.g., graphical user interfaces) of the messaging client application 104.

Turning now specifically to the messaging server system 108, an API server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the API server 110, this server 110 receives and transmits message data (e.g., commands and message payloads) between the client device 102 and the application server 112. Specifically, the API server 110 provides a set of interfaces (e.g., routines and protocols) that can be called or queried by the messaging client application 104 and the third-party application 105 in order to invoke functionality of the application server 112. The API server 110 exposes various functions supported by the application server 112, including account registration; login functionality; the sending of messages, via the application server 112, from a particular messaging client application 104 to another messaging client application 104 or third-party application 105; the sending of media files (e.g., graphical elements, images or video) from a messaging client application 104 to a messaging server application 114, and for possible access by another messaging client application 104 or third-party application 105; a graphical element list; the setting of a collection of media data (e.g., story); the retrieval of such collections; the retrieval of a list of friends of a user of a client device 102; maintaining augmented reality items; the retrieval of messages and content; the adding and deleting of friends to a social graph; the location of friends within a social graph; access to user conversation data; access to avatar information stored on messaging server system 108; and opening an application event (e.g., relating to the messaging client application 104).

The application server 112 hosts a number of applications and subsystems, including a messaging server application 114, an image processing system 116, a social network system 122, and the account recovery system 124. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114. A portion of the image processing system 116 may also be implemented by the account recovery system 124.

The social network system 122 supports various social networking functions and services and makes these functions and services available to the messaging server application 114. To this end, the social network system 122 maintains and accesses an entity graph within the database 120. Examples of functions and services supported by the social network system 122 include the identification of other users of the messaging system 100 with which a particular user has relationships or is "following" and also the identification of other entities and interests of a particular user. Such other users may be referred to as the user's friends. Social network system 122 may access location information associated with each of the user's friends to determine where they live or are currently located geographically. Social network system 122 may maintain a location profile for each of the user's friends indicating the geographical location where the user's friends live.

The account recovery system 124 allows a user to set up social account recovery and performs social two-factor authentication.

The application server 112 is communicatively coupled to a database server 118, which facilitates access to a database 120, in which is stored data associated with messages processed by the messaging server application 114. Database 120 may be a third-party database. For example, the application server 112 may be associated with a first entity, and the database 120 or a portion of the database 120 may be associated and hosted by a second different entity. In some implementations, database 120 stores user data that the first entity collects about various each of the users of a service provided by the first entity. For example, the user data includes user names, phone numbers, passwords, addresses, friends, activity information, preferences, videos or content consumed by the user, and so forth.

Figure 2:
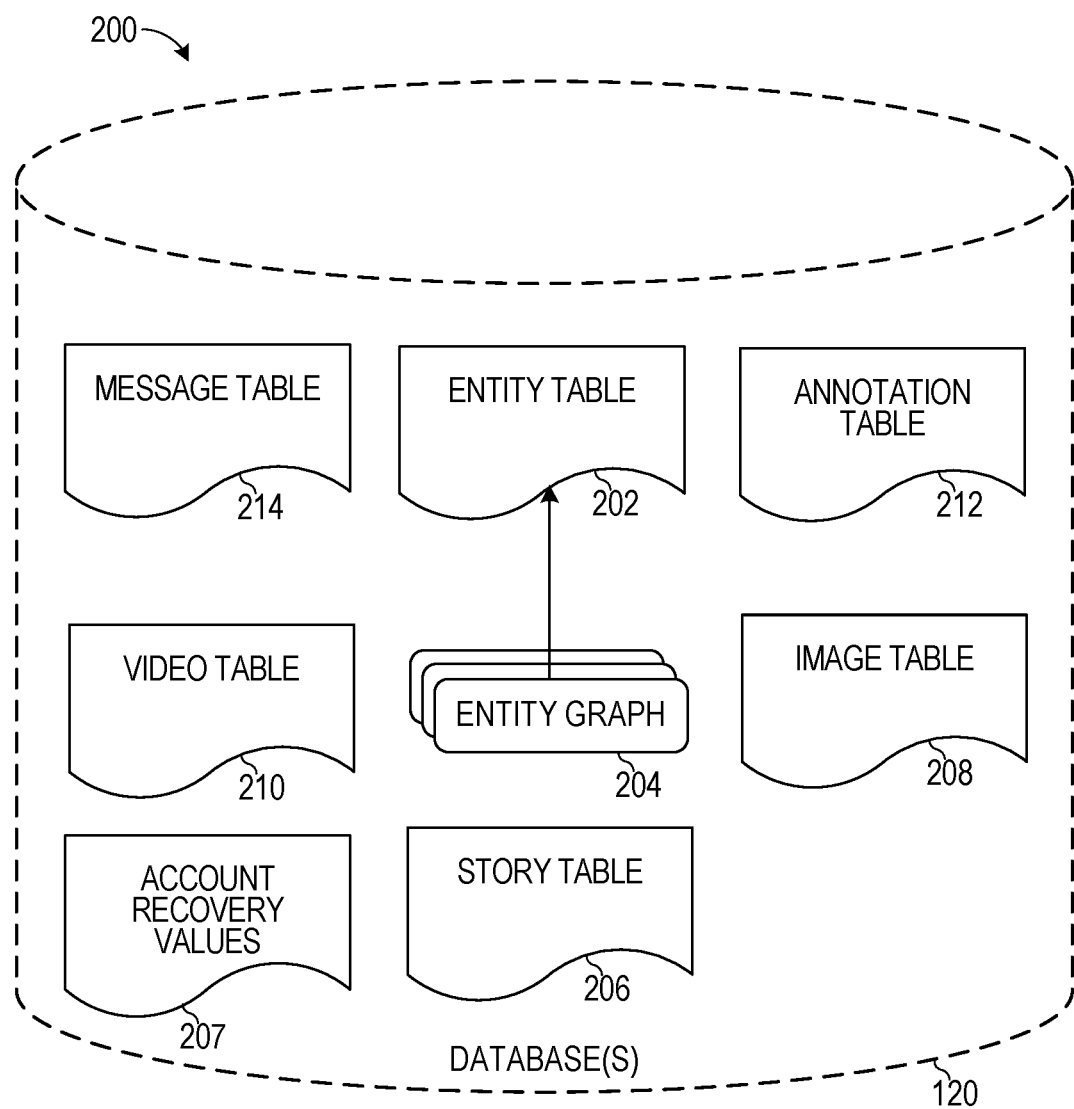
FIG. 2 is a schematic diagram illustrating data which may be stored in the database of a messaging server system, according to example embodiments.

FIG. 2 is a schematic diagram 200 illustrating data, which may be stored in the database 120 of the messaging server system 108, according to certain example embodiments.

While the content of the database 120 is shown to comprise a number of tables, it will be appreciated that the data could be stored in other types of data structures (e.g., as an object-oriented database).

The database 120 includes message data stored within a message table 214. An entity table 202 stores entity data, including an entity graph 204. Entities for which records are maintained within the entity table 202 may include individuals, corporate entities, organizations, objects, places, events, and so forth. Regardless of type, any entity regarding which the messaging server system 108 stores data may be a recognized entity. Each entity is provided with a unique identifier, as well as an entity type identifier (not shown).

The entity graph 204 stores information regarding relationships and associations between entities. Such relationships may be social, professional (e.g., work at a common corporation or organization), interest-based, or activity-based, merely for example.

Message table 214 may store a collection of conversations between a user and one or more friends or entities. Message table 214 may include various attributes of each conversation, such as the list of participants, the size of the conversation (e.g., number of users and/or number of messages), the chat color of the conversation, a unique identifier for the conversation, and any other conversation related feature(s).

The database 120 also stores annotation data, in the example form of filters, in an annotation table 212. Database 120 also stores annotated content received in the annotation table 212. Filters for which data is stored within the annotation table 212 are associated with and applied to videos (for which data is stored in a video table 210) and/or images (for which data is stored in an image table 208). Filters, in one example, are overlays that are displayed as overlaid on an image or video during presentation to a recipient user. Filters may be of various types, including user-selected filters from a gallery of filters presented to a sending user by the messaging client application 104 when the sending user is composing a message. Other types of filters include geolocation filters (also known as geo-filters), which may be presented to a sending user based on geographic location. For example, geolocation filters specific to a neighborhood or special location may be presented within a UI by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device 102 during the message creation process. Examples of data filters include current temperature at a specific location, a current speed at which a sending user is traveling, battery life for a client device 102, or the current time.

Other annotation data that may be stored within the image table 208 is so-called "LENS" data. A "LENS" may be a real-time special effect and sound that may be added to an image or a video. A LENS is also referred to as an augmented reality item.

As mentioned above, the video table 210 stores video data which, in one embodiment, is associated with messages for which records are maintained within the message table 214. Similarly, the image table 208 stores image data associated with messages for which message data is stored in the entity table 202. The entity table 202 may associate various annotations from the annotation table 212 with various images and videos stored in the image table 208 and the video table 210.

Account recovery values 207 stores various hash values for each user account. For example, a given user identifier may be associated in account recovery values 207 with a first hash HMAC(P, user ID), a second hash HMAC(P', user ID), a third hash HMAC(Q, user ID), and a fourth hash HMAC (P+Q, user ID). The first and third hashes may be associated with and used exclusively for performing two-factor authentication for a given user. The second hash may be associated with and used to trigger an account recovery process. The fourth hash may be associated and used to enable a user to login, and/or change a username and/or password for the account. The account recovery values 207 may store the value Q in plain text form and/or in encrypted form. Any of the hash values may be stored as plain text and/or encrypted forms.

A story table 206 stores data regarding collections of messages and associated image, video, or audio data, which are compiled into a collection (e.g., a story or a gallery). The creation of a particular collection may be initiated by a particular user (e.g., each user for which a record is maintained in the entity table 202). A user may create a "personal story" in the form of a collection of content that has been created and sent/broadcast by that user. To this end, the UI of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a UI of the messaging client application 104, to contribute content to a particular live story. The live story may be identified to the user by the messaging client application 104 based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 3:
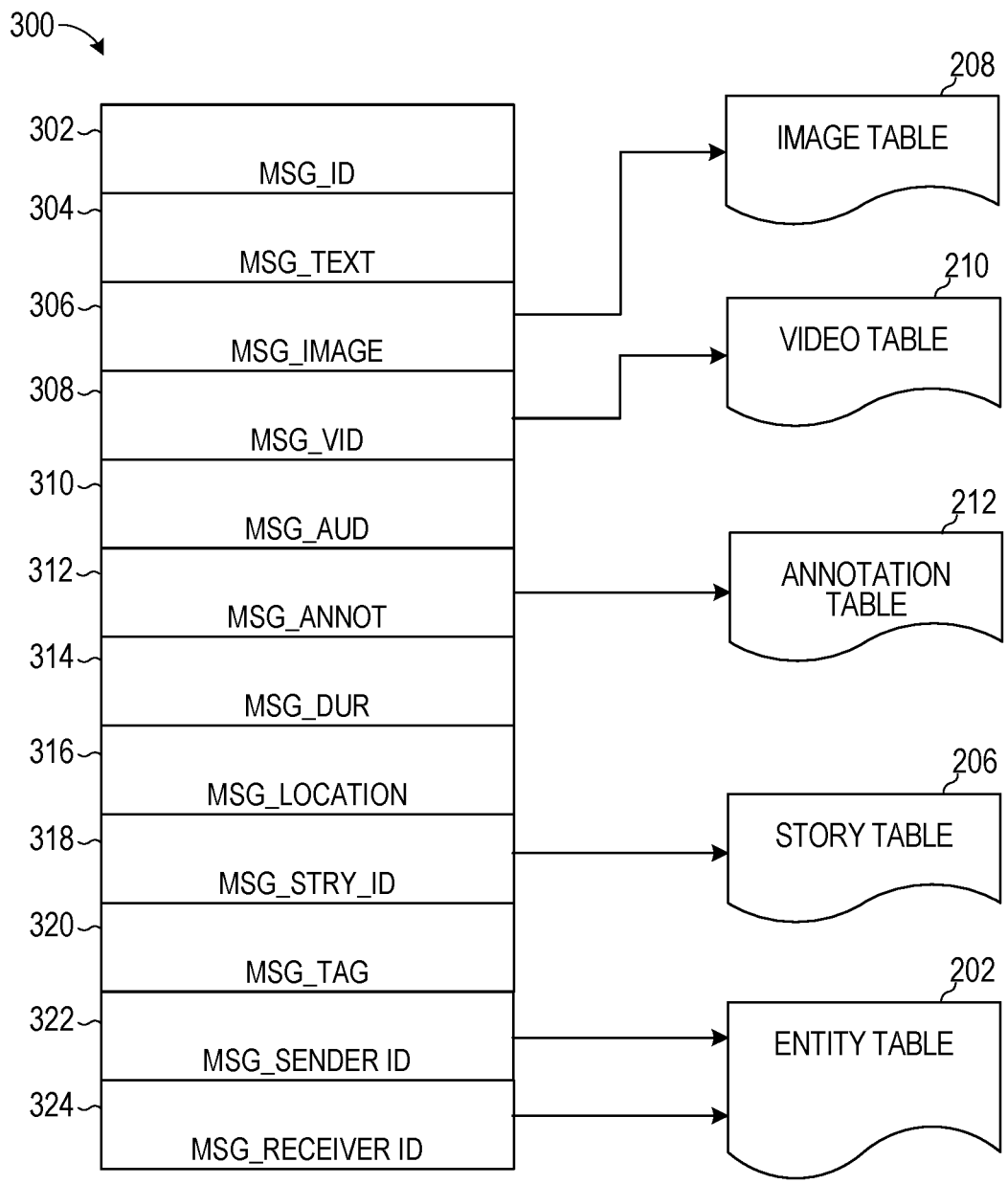
FIG. 3 is a schematic diagram illustrating a structure of a message generated by a messaging client application for communication, according to example embodiments.

FIG. 3 is a schematic diagram illustrating a structure of a message 300, according to some embodiments, generated by a messaging client application 104 for communication to a further messaging client application 104 or the messaging server application 114. The content of a particular message 300 is used to populate the message table 214 stored within the database 120, accessible by the messaging server application 114. Similarly, the content of a message 300 is stored in memory as "in-transit" or "in-flight" data of the client device 102 or the application server 112. The message 300 is shown to include the following components:

- A message identifier 302: a unique identifier that identifies the message 300.
- A message text payload 304: text, to be generated by a user via a UI of the client device 102 and that is included in the message 300.
- A message image payload 306: image data, captured by a camera component of a client device 102 or retrieved from memory of a client device 102, and that is included in the message 300.
- A message video payload 308: video data, captured by a camera component or retrieved from a memory component of the client device 102 and that is included in the message 300.
- A message audio payload 310: audio data, captured by a microphone or retrieved from the memory component of the client device 102, and that is included in the message 300.
- Message annotations 312: annotation data (e.g., filters, stickers, or other enhancements) that represents annotations to be applied to message image payload 306, message video payload 308, or message audio payload 310 of the message 300.
- A message duration parameter 314: parameter value indicating, in seconds, the amount of time for which content of the message (e.g., the message image payload 306, message video payload 308, message audio payload 310) is to be presented or made accessible to a user via the messaging client application 104.
- A message geolocation parameter 316: geolocation data (e.g., latitudinal and longitudinal coordinates) associated with the content payload of the message. Multiple message geolocation parameter 316 values may be included in the payload, with each of these parameter values being associated with respect to content items included in the content (e.g., a specific image within the message image payload 306, or a specific video in the message video payload 308).
- A message story identifier 318: identifier value identifying one or more content collections (e.g., "stories") with which a particular content item in the message image payload 306 of the message 300 is associated. For example, multiple images within the message image payload 306 may each be associated with multiple content collections using identifier values.
- A message tag 320: each message 300 may be tagged with multiple tags, each of which is indicative of the subject matter of content included in the message payload. For example, where a particular image included in the message image payload 306 depicts an animal (e.g., a lion), a tag value may be included within the message tag 320 that is indicative of the relevant animal. Tag values may be generated manually, based on user input, or may be automatically generated using, for example, image recognition.
- A message sender identifier 322: an identifier (e.g., a messaging system identifier, email address, or device identifier) indicative of a user of the client device 102 on which the message 300 was generated and from which the message 300 was sent.
- A message receiver identifier 324: an identifier (e.g., a messaging system identifier, email address, or device identifier) indicative of user(s) of the client device 102 to which the message 300 is addressed. In the case of a conversation between multiple users, the identifier may indicate each user involved in the conversation.

The contents (e.g., values) of the various components of message 300 may be pointers to locations in tables within which content data values are stored. For example, an image value in the message image payload 306 may be a pointer to (or address of) a location within an image table 208. Similarly, values within the message video payload 308 may point to data stored within a video table 210, values stored within the message annotations 312 may point to data stored in an annotation table 212, values stored within the message story identifier 318 may point to data stored in a story table 206, and values stored within the message sender identifier 322 and the message receiver identifier 324 may point to user records stored within an entity table 202.

Figure 4:
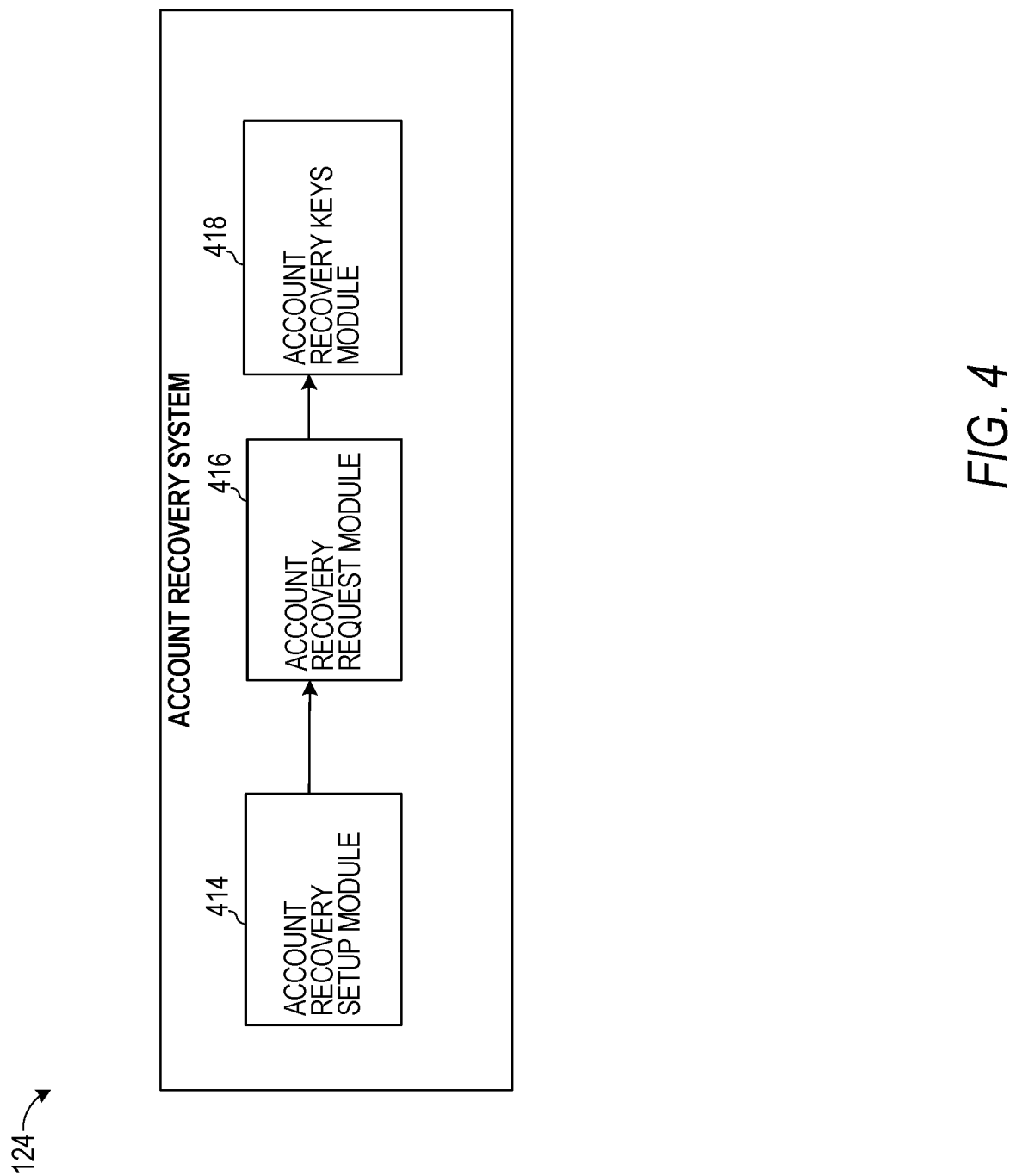
FIG. 4 is a block diagram showing an example account recovery system, according to example embodiments.

FIG. 4 is a block diagram showing an example account recovery system 124, according to example embodiments. Account recovery system 124 includes an account recovery setup module 414, an account recovery request module 416, and an account recovery keys module 418.

The account recovery setup module 414 enables a user to activate a social account recovery process for the user's account. The account recovery setup module 414 generates a first secret (key) that may be a random integer value. The account recovery setup module 414 generates a second secret (key) that may be a k-degree polynomial or function. The account recovery setup module 414 encodes the first secret in an object or graphical element and instructs the user to safely keep the object or graphical element. In some cases, the account recovery setup module 414 displays the graphical element and instructs the user to capture a screenshot of the graphical element. The screenshot may be stored locally on the client device 102 and/or on another storage device associated with the user. The account recovery setup module 414 generates a derivation of the first secret (e.g., P').

In an implementation, the account recovery setup module 414 generates a first hash by applying a hash function HMAC to the first secret (P) and the user ID. The account recovery setup module 414 generates a second hash by applying the hash function HMAC to the derived secret P' from the first secret and the user ID. The account recovery setup module 414 generates a third hash by applying the hash function HMAC to the second secret (Q) and the user ID. The account recovery setup module 414 generates a fourth hash by combining (summing) the first and second secrets and applying the hash function HMAC to the combined first and second secrets (P+Q) and the user ID. The account recovery setup module 414 sends to the server the first, second, third and fourth hash values for storage in association with the user's account in account recovery values 207. After generating the second secret and sending the hash values to the server, the account recovery setup module 414 may delete from local storage the second secret.

The account recovery request module 416 allows a user to socially recover access to the user's account. Specifically, the account recovery request module 416 receives a user selection of an option to recover access to the user's account socially (e.g., by selecting a forgot password option). In response, the account recovery request module 416 requests that the user provide the first secret (key). The user can provide the first secret by uploading or capturing an image of the graphical element that encodes the first secret P (e.g., the integer value). Next, the account recovery request module 416 derives P' from P and computes a hash of the user identifier and P'. The account recovery request module 416 communicates this hash to the server. The server verifies that this computed hash matches the second hash value stored in association with the user's account. In response to determining that the values match, the server enables the social account recovery procedure on the account.

The user communicates, via the third-party application 105, with a first friend with which the user is bi-directionally connected on the messaging client application 104. For example, the user calls the first friend via the third-party application 105 and requests that the first friend authorize the social account recovery for the user. The first friend logs into their messaging client application 104 on their own device and identifies the user in a list of friends of the friend. The first friend selects a social account recovery option for the identified user and transmits a message to the server requesting that the server recover the user's account. In response, the server verifies that the social account recovery procedure has been enabled on the account. If the social account recovery procedure has been enabled, the server computes a value specific to the first friend based on the second secret (e.g., the second key). Namely, the server retrieves the second secret Q associated with the user's account from account recovery values 207 and randomly selects a first point along the polynomial corresponding to the second secret Q. The server encodes the first point in a graphical element or object and sends the graphical element or object to the first friend. The first friend then sends the graphical element or object that encodes the first point to the user via the third-party application 105.

The user also communicates, via the third-party application 105, with a second friend with which the user is bi-directionally connected on the messaging client application 104. For example, the user sends a message to the second friend via the third-party application 105 and requests that the second friend authorize the social account recovery for the user. The second friend logs into their messaging client application 104 on their own device and identifies the user in a list of friends of the friend. The second friend selects a social account recovery option for the identified user and transmits a message to the server requesting that the server recover the user's account. In response, the server verifies that the social account recovery procedure has been enabled on the account. If the social account recovery procedure has been enabled, the server computes a value specific to the second friend based on the second secret (e.g., the second key). Namely, the server retrieves the second secret Q associated with the user's account from account recovery values 207 and randomly selects a second point (different from the first point) along the polynomial corresponding to the second secret Q. The server encodes the second point in a graphical element or object and sends the graphical element or object to the second friend. The second friend then sends the graphical element or object that encodes the second point to the user via the third-party application 105.

The user, after receiving the graphical elements or objects from the first and second friends via the third-party application 105, inputs the graphical elements or objects received from the first and second friends into the account recovery request module 416. The account recovery request module 416 provides the graphical elements or objects received from the first and second friends to the account recovery keys module 418. The account recovery keys module 418 decodes the first and second points from the graphical elements or objects received from the first and second friends. The account recovery keys module 418 computes the polynomial based on the first and second points that correspond to the second secret. The account recovery keys module 418 next computes a hash of the first secret, second secret, and user identifier and sends this hash to the server. The server compares the received hash to the fourth hash value stored for the user in the account recovery values 207. In response to determining that the hash values match, the server enables or instructs the account recovery request module 416 to allow the user to login and/or change a username and/or password of the user's account. After successfully changing the username and/or password, the first and second secrets are rotated and/or replaced by new values.

In some embodiments, the account recovery system performs similar hashing functions and/or first and second key retrieval functions when requested to perform second factor authentication by the server. In such cases, the account recovery request module 416 may be used to receive the first secret from the user after the user successfully logs into the messaging client application 104. The account recovery request module 416 may hash the first secret with the user identifier based on the hash function and send the hash value to the server. The server may compare the hash value to the first hash value stored in the account recovery values 207. In response to determining that the hash values match, the server may allow the user to proceed to access the messaging client application and determine that the second factor authentication is satisfied.

In some cases, the account recovery request module 416 may request that the user obtain first and second graphical elements from the user's friends that encode first and second respective portions of the second secret. The user can provide the first and second graphical elements to the account recovery request module 416. The account recovery request module 416 may compute the second secret after decoding the first and second portions from the first and second graphical elements. The account recovery request module 416 may compute a hash based on a hash function of the second secret and the user identifier. The account recovery request module 416 may provide this hash to the server. The server may determine that the hash value matches the third hash in the account recovery values 207. In response to determining that the hash values match, the server may allow the user to proceed to access the messaging client application and determine that the second factor authentication is satisfied.

Figure 5:
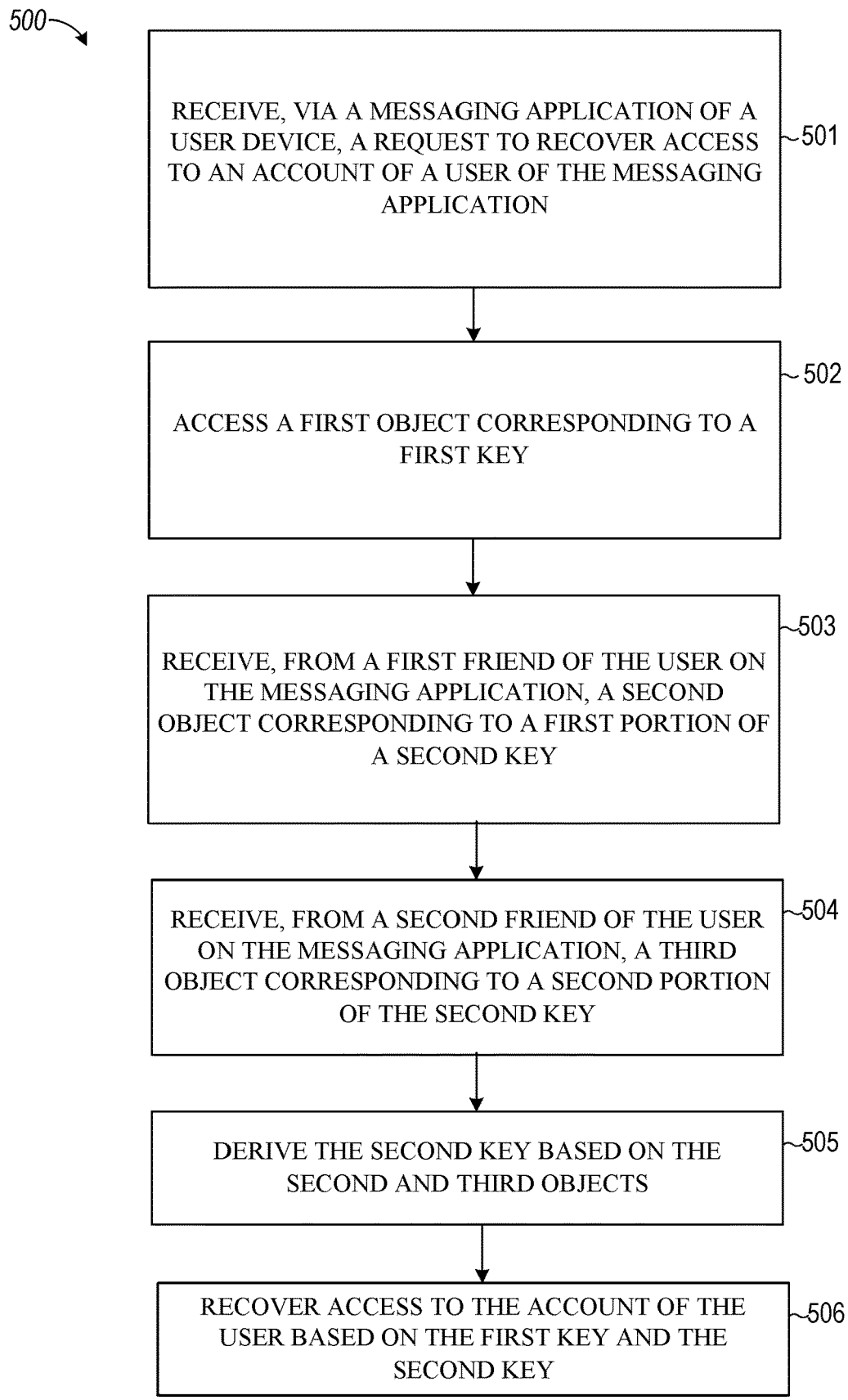
FIG. 5 is a flowchart illustrating example operations of the account recovery system, according to example embodiments.

FIG. 5 is a flowchart illustrating example operations of the account recovery system 124 in performing process 500, according to example embodiments. The process 500 may be embodied in computer-readable instructions for execution by one or more processors such that the operations of the process 500 may be performed in part or in whole by the functional components of the messaging server system 108 and/or third-party application 105; accordingly, the process 500 is described below by way of example with reference thereto. However, in other embodiments, at least some of the operations of the process 500 may be deployed on various other hardware configurations. The process 500 is therefore not intended to be limited to the messaging server system 108 and can be implemented in whole, or in part, by any other component. Some or all of the operations of process 500 can be in parallel, out of order, or entirely omitted.

At operation 501, the account recovery system 124 receives, via a messaging application of a user device, a request to recover access to an account of the user of the messaging application.

At operation 502, the account recovery system 124 access a first object corresponding to a first key (secret).

At operation 503, the account recovery system 124 receives from a first friend of the user on the messaging application a second object corresponding to a first portion of a second key (secret).

At operation 504, the account recovery system 124 receives from a second friend of the user on the messaging application a third object corresponding to a second portion of a second key (secret).

At operation 505, the account recovery system 124 derives the second key (secret) based on the second and third objects.

At operation 506, the account recovery system 124 recovers access to the account of the user based on the first key and the second key.

Figure 6:
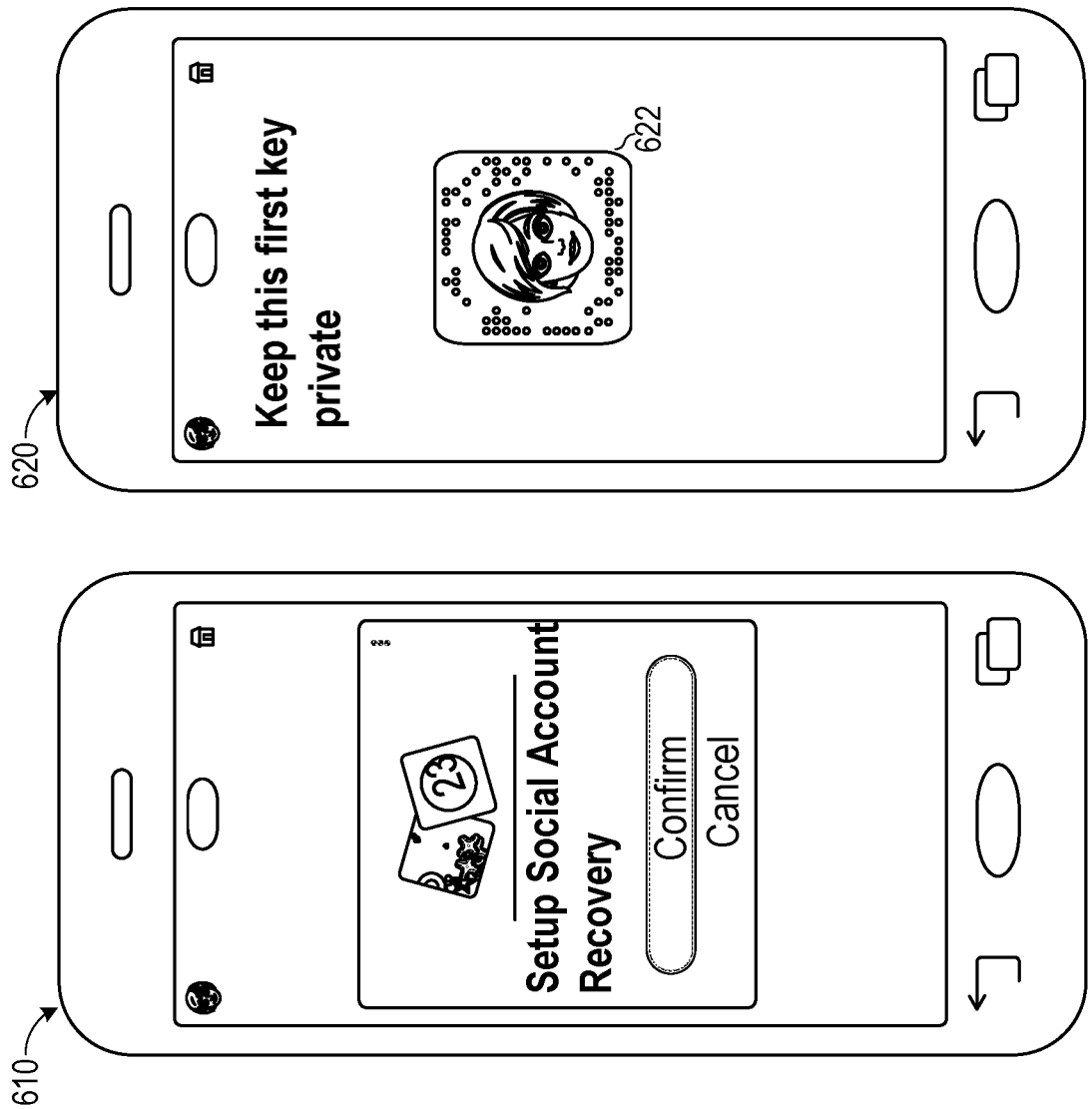
Figure 7:
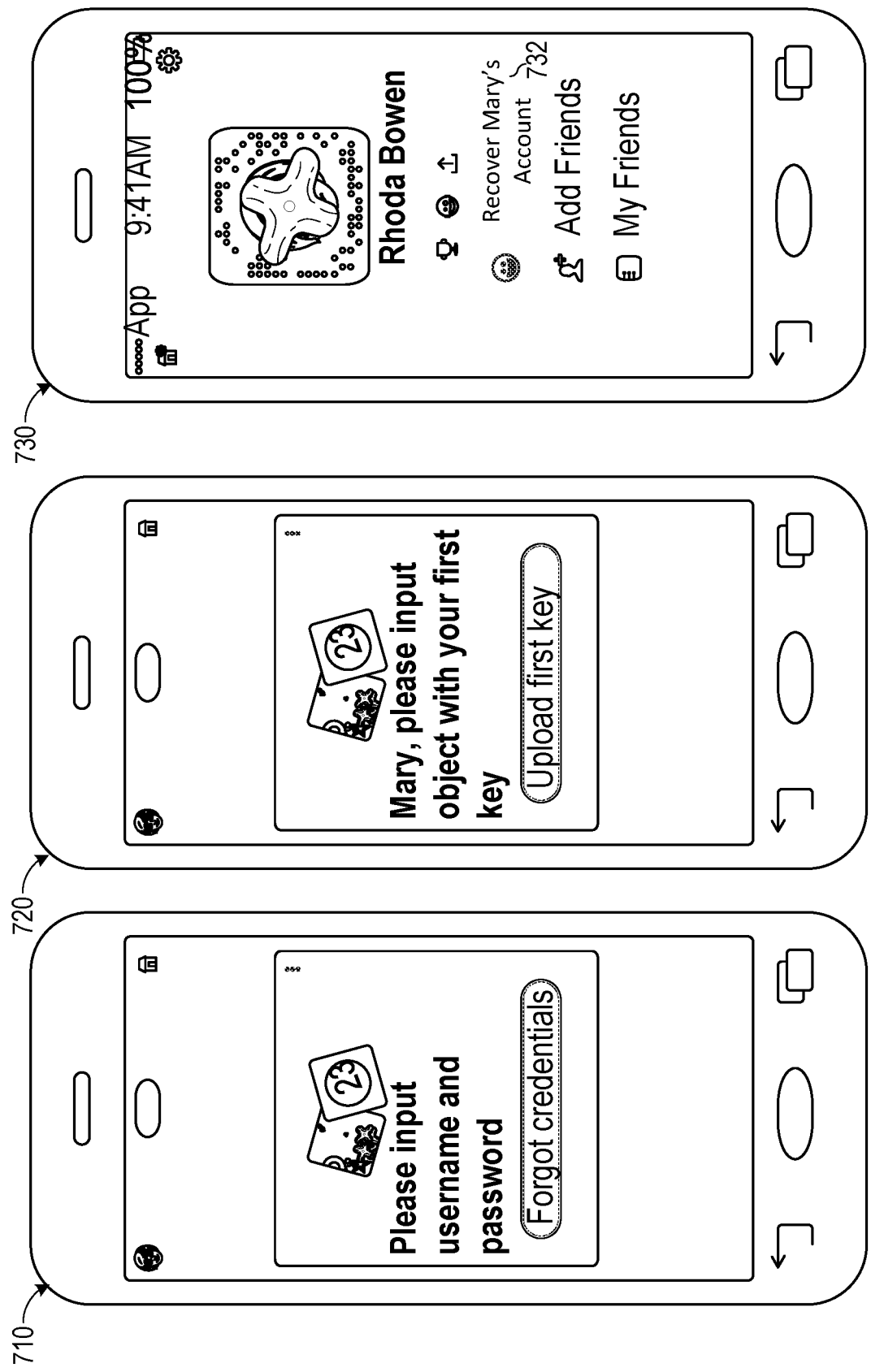

FIGS. 6-8 are illustrative inputs and outputs of the account recovery system 124, according to example embodiments. FIG. 6 shows a screen 610 presented to the user in response to the messaging client application 104 receiving a user selection of an option to set up social account recovery. In response to receiving a user selection of a confirmation option in screen 610, the messaging client application 104 generates a first secret (key) and a second secret (key). The messaging client application 104 encodes the first secret in a graphical element 622 and presents the graphical element 622 in a screen 620. The user can press suitable buttons on the client device 102 to capture a screenshot of the graphical element 622 that encodes the first key.

At a later time, the user may access a login screen 710 of the messaging client application 104. Specifically, FIG. 7 shows a login screen 710 that allows the user to input credentials for accessing features of the messaging client application 104. The user may forget the credentials and select the forgot credential option in screen 710. The messaging client application 104 may determine whether the user has previously set up social account recovery. In response to determining that the user has previously set up social account recovery, the messaging client application 104 may request that the user upload the first secret (e.g., the integer value). The messaging client application 104 may present a screen 720 that requests the user provide the graphical element or object that encodes the first secret. The user can retrieve the previously captured screen shot of the graphical element that encodes the first secret. The user can upload a file that includes the graphical element that encodes the first secret. Alternatively, the user can activate a camera function and cause the graphical element that encodes the first secret to be presented on a display of another device. The camera may be pointed at the other device and automatically captures the image of the graphical element that encodes the first secret and provides the graphical element to the messaging client application 104 as the first key. The messaging client application 104 generates a hash of a derived key P' and the user identifier and sends the hash to a server to enable social account recovery for the user.

The user (e.g., Mary) contacts a first friend (e.g., Rhoda Bowen) by calling or messaging that first friend on another platform, such as on the third-party application 105. The user requests that the first friend obtain a portion of the second secret to assist the user in recovering the account. In response, the first friend logs into their messaging client application 104 implemented on their device. After logging in, the first friend accesses a profile page 730 and identifies the user in the list of friends of the first friend. The user may be a bi-directional friend of the first friend, meaning that the user previously sent a request to be friends with the first friend and the first friend accepted the request. The first friend may select a "Recover Mary's Account" option 732. In response to selecting the option 732, the first friend may receive from the server a first graphical element that encodes a first point or portion of a second secret (key) of the user. The first friend may send the first graphical element to the user via the third-party application 105. For example, the user may receive the first graphical element 812 in a message shown in FIG. 8. The user may store the first graphical element 812 by capturing a screenshot of the first graphical element.

The user (e.g., Mary) also contacts a second friend (e.g., Roger) by calling or messaging that second friend on another platform, such as on the third-party application 105. The user requests that the second friend also obtain a portion of the second secret to assist the user in recovering the account. In response, the second friend logs into their messaging client application 104 implemented on their device. After logging in, the second friend accesses a profile page 730 and identifies the user in the list of friends of the second friend. The user may be a bi-directional friend of the second friend, meaning that the user previously sent a request to be friends with the second friend and the second friend accepted the request. The second friend may select a recover Mary's account option 732. In response to selecting the option 732, the second friend may receive from the server a second graphical element that encodes a second point or portion of a second secret (key) of the user. The second friend may send the second graphical element to the user via the third-party application 105. The user may store the second graphical element by capturing a screenshot of the second graphical element.

The messaging client application 104 may present a screen to the user allowing the user to input the first and second graphical elements that encode respective portions of the second secret. For example, the user can select an "upload first object" option 814. In response, the user can upload a file (previously captured screenshot of the first graphical element) or activate a camera to capture an image of the first graphical element presented on anther display (e.g., on a display of the first friend's device). The user can select an "upload second object" option 816. In response, the user can upload a file (previously captured screenshot of the second graphical element) or activate a camera to capture an image of the second graphical element presented on anther display (e.g., on a display of the second friend's device). The user has now provided to the messaging client application 104 a graphical element that the messaging client application 104 decodes to obtain the first secret and two or more graphical elements that the messaging client application 104 decodes to obtain the second secret. In response to the user selecting the recover account option 818, the messaging client application 104 generates a hash by applying a hash function to the first secret, the second secret, and the user identifier. The messaging client application 104 transmits this hash value to the server. The server verifies that the hash value matches the hash value stored for the user. In response to the hash values matching, the server allows the user to recover the account by logging the user into the messaging client application 104 and/or changing a username and/or password for the user.

Figure 9:
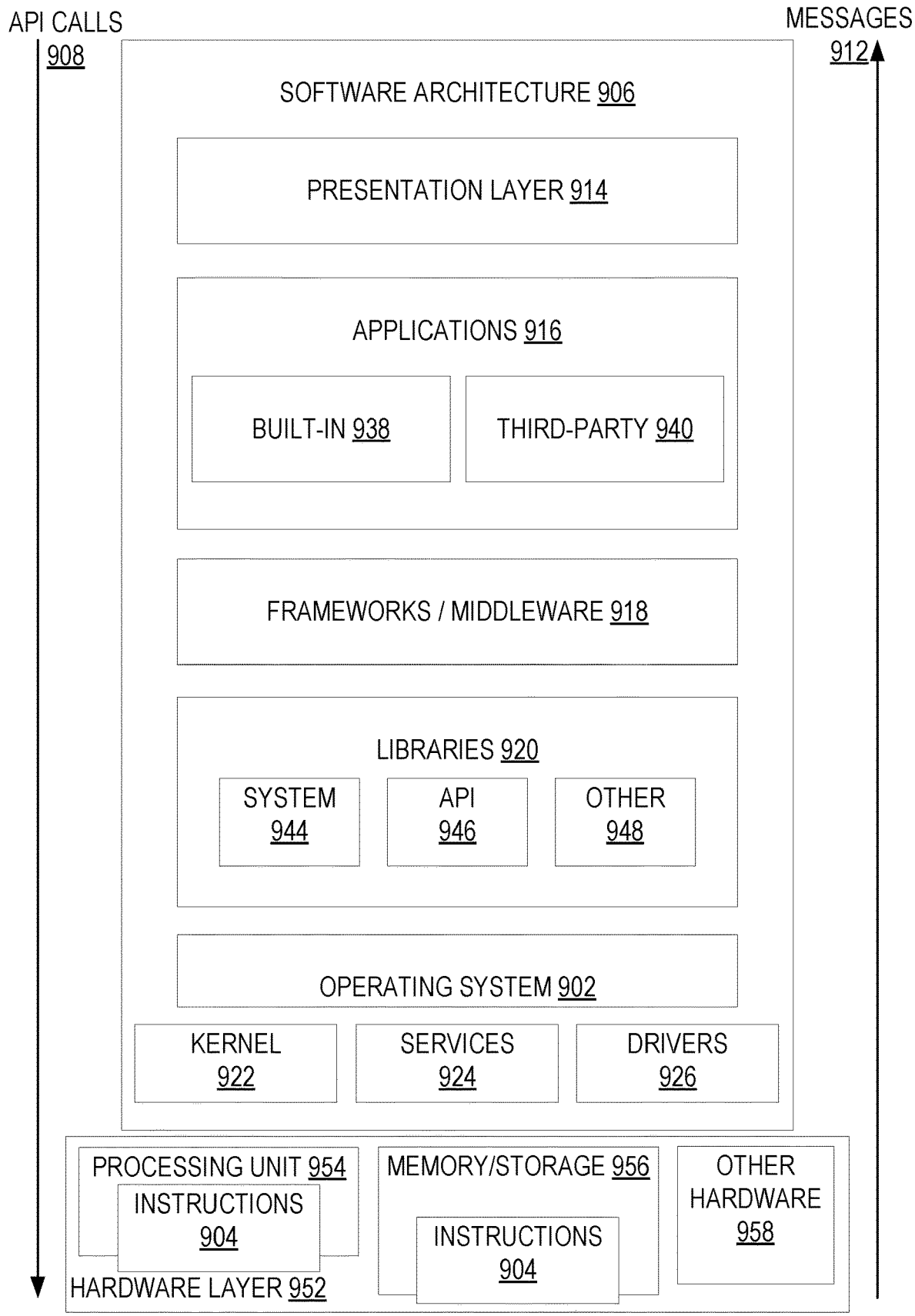
FIG. 9 is a block diagram illustrating a representative software architecture, which may be used in conjunction with various hardware architectures herein described, according to example embodiments.

FIG. 9 is a block diagram illustrating an example software architecture 906, which may be used in conjunction with various hardware architectures herein described. FIG. 9 is a non-limiting example of a software architecture and it will be appreciated that many other architectures may be implemented to facilitate the functionality described herein. The software architecture 906 may execute on hardware such as machine 1000 of FIG. 10 that includes, among other things, processors 1004, memory 1014, and input/output (I/O) components 1018. A representative hardware layer 952 is illustrated and can represent, for example, the machine 1000 of FIG. 10. The representative hardware layer 952 includes a processing unit 954 having associated executable instructions 904. Executable instructions 904 represent the executable instructions of the software architecture 906, including implementation of the methods, components, and so forth described herein. The hardware layer 952 also includes memory and/or storage modules memory/storage 956, which also have executable instructions 904. The hardware layer 952 may also comprise other hardware 958.

In the example architecture of FIG. 9, the software architecture 906 may be conceptualized as a stack of layers where each layer provides particular functionality. For example, the software architecture 906 may include layers such as an operating system 902, libraries 920, frameworks/middleware 918, applications 916, and a presentation layer 914. Operationally, the applications 916 and/or other components within the layers may invoke API calls 908 through the software stack and receive messages 912 in response to the API calls 908. The layers illustrated are representative in nature and not all software architectures have all layers. For example, some mobile or special purpose operating systems may not provide a frameworks/middleware 918, while others may provide such a layer. Other software architectures may include additional or different layers.

The operating system 902 may manage hardware resources and provide common services. The operating system 902 may include, for example, a kernel 922, services 924, and drivers 926. The kernel 922 may act as an abstraction layer between the hardware and the other software layers. For example, the kernel 922 may be responsible for memory management, processor management (e.g., scheduling), component management, networking, security settings, and so on. The services 924 may provide other common services for the other software layers. The drivers 926 are responsible for controlling or interfacing with the underlying hardware. For instance, the drivers 926 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 920 provide a common infrastructure that is used by the applications 916 and/or other components and/or layers. The libraries 920 provide functionality that allows other software components to perform tasks in an easier fashion than to interface directly with the underlying operating system 902 functionality (e.g., kernel 922, services 924 and/or drivers 926). The libraries 920 may include system libraries 944 (e.g., C standard library) that may provide functions such as memory allocation functions, string manipulation functions, mathematical functions, and the like. In addition, the libraries 920 may include API libraries 946 such as media libraries (e.g., libraries to support presentation and manipulation of various media format such as MPREG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 920 may also include a wide variety of other libraries 948 to provide many other APIs to the applications 916 and other software components/modules.

The frameworks/middleware 918 (also sometimes referred to as middleware) provide a higher-level common infrastructure that may be used by the applications 916 and/or other software components/modules. For example, the frameworks/middleware 918 may provide various graphic user interface functions, high-level resource management, high-level location services, and so forth. The frameworks/middleware 918 may provide a broad spectrum of other APIs that may be utilized by the applications 916 and/or other software components/modules, some of which may be specific to a particular operating system 902 or platform.

The applications 916 include built-in applications 938 and/or third-party applications 940. Examples of representative built-in applications 938 may include, but are not limited to, a contacts application, a browser application, a book reader application, a location application, a media application, a messaging application, and/or a game application. Third-party applications 940 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 940 may invoke the API calls 908 provided by the mobile operating system (such as operating system 902) to facilitate functionality described herein.

The applications 916 may use built-in operating system functions (e.g., kernel 922, services 924, and/or drivers 926), libraries 920, and frameworks/middleware 918 to create UIs to interact with users of the system. Alternatively, or additionally, in some systems, interactions with a user may occur through a presentation layer, such as presentation layer 914. In these systems, the application/component "logic" can be separated from the aspects of the application/component that interact with a user.

Figure 10:
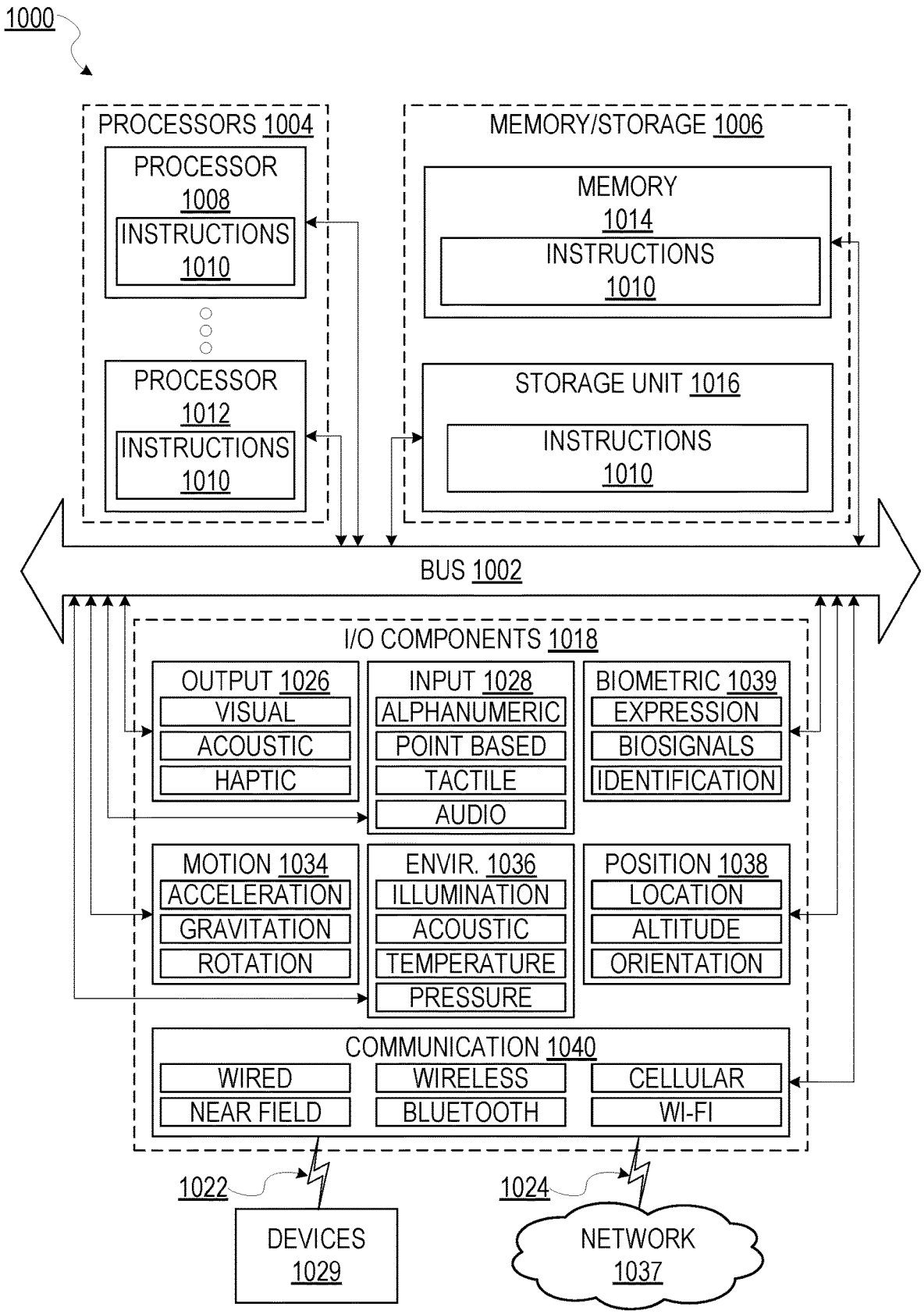
FIG. 10 is a block diagram illustrating components of a machine able to read instructions from a machine-readable medium (e.g., a machine-readable storage medium) and perform any one or more of the methodologies discussed herein, according to example embodiments.

FIG. 10 is a block diagram illustrating components of a machine 1000, according to some example embodiments, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1010 (e.g., software, a program, an application, an applet, an app, or other executable code) for causing the machine 1000 to perform any one or more of the methodologies discussed herein may be executed. As such, the instructions 1010 may be used to implement modules or components described herein. The instructions 1010 transform the general, non-programmed machine 1000 into a particular machine 1000 programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1010, sequentially or otherwise, that specify actions to be taken by machine 1000. Further, while only a single machine 1000 is illustrated, the term "machine" shall also be taken to include a collection of machines that individually or jointly execute the instructions 1010 to perform any one or more of the methodologies discussed herein.

The machine 1000 may include processors 1004, memory/storage 1006, and I/O components 1018, which may be configured to communicate with each other such as via a bus 1002. In an example embodiment, the processors 1004 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1008 and a processor 1012 that may execute the instructions 1010. The term "processor" is intended to include multi-core processors 1004 that may comprise two or more independent processors (sometimes referred to as "cores") that may execute instructions 1010 contemporaneously. Although FIG. 10 shows multiple processors 1004, the machine 1000 may include a single processor with a single core, a single processor with multiple cores (e.g., a multi-core processor), multiple processors with a single core, multiple processors with multiple cores, or any combination thereof.

The memory/storage 1006 may include a memory 1014, such as a main memory, or other memory storage, and a storage unit 1016, both accessible to the processors 1004 such as via the bus 1002. The storage unit 1016 and memory 1014 store the instructions 1010 embodying any one or more of the methodologies or functions described herein. The instructions 1010 may also reside, completely or partially, within the memory 1014, within the storage unit 1016, within at least one of the processors 1004 (e.g., within the processor's cache memory), or any suitable combination thereof, during execution thereof by the machine 1000. Accordingly, the memory 1014, the storage unit 1016, and the memory of processors 1004 are examples of machine-readable media.

The I/O components 1018 may include a wide variety of components to receive input, provide output, produce output, transmit information, exchange information, capture measurements, and so on. The specific I/O components 1018 that are included in a particular machine 1000 will depend on the type of machine. For example, portable machines such as mobile phones will likely include a touch input device or other such input mechanisms, while a headless server machine will likely not include such a touch input device. It will be appreciated that the I/O components 1018 may include many other components that are not shown in FIG. 10. The I/O components 1018 are grouped according to functionality merely for simplifying the following discussion and the grouping is in no way limiting. In various example embodiments, the I/O components 1018 may include output components 1026 and input components 1028. The output components 1026 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1028 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1018 may include biometric components 1039, motion components 1034, environmental components 1036, or position components 1038 among a wide array of other components. For example, the biometric components 1039 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1034 may include acceleration sensor components (e.g., accelerometer), gravitation sensor components, rotation sensor components (e.g., gyroscope), and so forth. The environmental components 1036 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1038 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1018 may include communication components 1040 operable to couple the machine 1000 to a network 1037 or devices 1029 via coupling 1024 and coupling 1022, respectively. For example, the communication components 1040 may include a network interface component or other suitable device to interface with the network 1037. In further examples, communication components 1040 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1029 may be another machine or any of a wide variety of peripheral devices (e.g., a peripheral device coupled via a USB).

Moreover, the communication components 1040 may detect identifiers or include components operable to detect identifiers. For example, the communication components 1040 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1040, such as location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying transitory or non-transitory instructions for execution by the machine, and includes digital or analog communications signals or other intangible medium to facilitate communication of such instructions. Instructions may be transmitted or received over the network using a transitory or non-transitory transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, PDA, smart phone, tablet, ultra book, netbook, laptop, multi-processor system, microprocessor-based or programmable consumer electronics, game console, set-top box, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EPHEMERAL MESSAGE" in this context refers to a message that is accessible for a time-limited duration. An ephemeral message may be a text, an image, a video, and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device, or other tangible media able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an ASIC. A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output.

Hardware components may also initiate communications with input or output devices and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine. A processor may, for example, be a CPU, a RISC processor, a CISC processor, a GPU, a DSP, an ASIC, a RFIC or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

Changes and modifications may be made to the disclosed embodiments without departing from the scope of the present disclosure. These and other changes or modifications are intended to be included within the scope of the present disclosure, as expressed in the following claims.

What is claimed is:

1. A method comprising:
receiving, by a server from a user device, a first value computed as a hash of a first key and a user identifier;
determining, by the server, that the first value matches a previously computed value for requesting account recovery access for an account of a user corresponding to the user identifier;
in response to determining, by the server, that the first value matches the previously computed value for requesting account recovery access for the account of the user, enabling an account recovery mode;
receiving, by the server, a first request from a first friend device of a first friend for a first portion of a second key; and
selecting, by the server, a first random point of a line corresponding to the second key, the first random point being exclusively associated with the first friend.

2. The method of claim 1, further comprising:
receiving, via an application implemented on the user device, a request to recover access to the account;
accessing a first object corresponding to the first key;
receiving, from a computing device of a first friend of the user, a second object corresponding to a first portion of the second key;
receiving, from a computing device of a second friend of the user, a third object corresponding to a second portion of the second key;
deriving the second key based on the second and third objects; and
recovering access to the account of the user based on the first key and the second key.

3. The method of claim 1, wherein the first key comprises an integer and the second key comprising a k-degree polynomial.

4. The method of claim 1, further comprising allowing the user to change login credentials for the account to recover access to the account.

5. The method of claim 1, further comprising:
receiving input from the user to enable a social-based account access recovery feature; and
in response to receiving the input, generating the first key.

6. The method of claim 5, further comprising generating the second key that represents the line.

7. The method of claim 6, further comprising:
computing the first value by applying a hash function to the first key, the second key, and the identifier of the user; and
storing the first value on a server.

8. The method of claim 7, further comprising:
computing a second value by applying the hash function to the first key and the identifier of the user;
computing a third value by applying the hash function to the second key and the identifier of the user;
deriving a third key from the first key;
computing a fourth value by applying the hash function to a third key and the identifier of the user; and
storing the second, third and fourth values on a server.

9. The method of claim 1, further comprising capturing an image of a barcode or visual code that encodes the first key using the user device.

10. The method of claim 1, further comprising:
generating, by the server, a second object using the first random point;
providing, by the server, the second object to the first friend device; and
transmitting, from the first friend device, the second object to the user device of the user.

11. The method of claim 10, further comprising, during the account recovery mode:
receiving, by the server, a second request from a second friend device of the second friend for the second portion of the second key;
selecting, by the server, a second random point of the line corresponding to the second key, the second random point being exclusively associated with the second friend;
generating, by the server, a third object using the second random point;
providing, by the server, the third object to the second friend device; and
transmitting, from the second friend device, the third object to the user device of the user.

12. The method of claim 11, wherein the second and third objects are sent to the user device via different applications.

13. The method of claim 1, further comprising:
generating the first value by applying a hash function to the user identifier, the first key and a second key;
transmitting the first value to a server; and
determining, by the server, that the first value matches a previously computed value for recovering account access for the user, wherein access to the account is recovered in response to determining that the first value matches the previously computed value.

14. The method of claim 1, further comprising:
triggering second factor authentication in response to receiving proper login credentials from the user to access the account; and
in response to triggering the second factor authentication, enabling the user to verify the account by providing a value computed using the first key.

15. A system comprising:
at least one processor of a computing device configured to perform operations comprising:
receiving, by a server from a user device, a first value computed as a hash of a first key and a user identifier;
determining, by the server, that the first value matches a previously computed value for requesting account recovery access for an account of a user corresponding to the user identifier;
in response to determining, by the server, that the first value matches the previously computed value for requesting account recovery access for the account of the user, enabling an account recovery mode;
receiving, by the server, a first request from a first friend device of a first friend for a first portion of a second key; and
selecting, by the server, a first random point of a line corresponding to the second key, the first random point being exclusively associated with the first friend.

16. The system of claim 15, the operations comprising:
receiving, via an application implemented on the user device, a request to recover access to the account;
accessing a first object corresponding to the first key;
receiving, from a computing device of a first friend of the user, a second object corresponding to a first portion of a second key;
receiving, from a computing device of a second friend of the user, a third object corresponding to a second portion of the second key;
deriving the second key based on the second and third objects; and
recovering access to the account of the user based on the first key and the second key.

17. The system of claim 15, wherein the first key comprises an integer and the second key comprising a k-degree polynomial.

18. The system of claim 15, the operations comprising allowing the user to change login credentials for the account to recover access to the account.

19. The system of claim 15, the operations comprising:
receiving input from the user to enable a social-based account access recovery feature; and
in response to receiving the input, generating the first key.

20. A non-transitory machine-readable storage medium that includes instructions that, when executed by one or more processors of a machine, cause the machine to perform operations comprising:
receiving, by a server from a user device, a first value computed as a hash of a first key and a user identifier;
determining, by the server, that the first value matches a previously computed value for requesting account recovery access for an account of a user corresponding to the user identifier;
in response to determining, by the server, that the first value matches the previously computed value for requesting account recovery access for the account of the user, enabling an account recovery mode;
receiving, by the server, a first request from a first friend device of a first friend for a first portion of a second key; and
selecting, by the server, a first random point of a line corresponding to the second key, the first random point being exclusively associated with the first friend.

* * * * *